(12) United States Patent  (10) Patent No.: US 10,863,083 B2
Morioka  (45) Date of Patent: Dec. 8, 2020

(54) IMAGE PROCESSING SYSTEM AND IMAGE PROCESSING METHOD

(71) Applicant: Ricoh Company, Ltd., Tokyo (JP)

(72) Inventor: Makoto Morioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 15/065,575

(22) Filed: Mar. 9, 2016

(65) Prior Publication Data

US 2016/0269632 A1 Sep. 15, 2016

(30) Foreign Application Priority Data

Mar. 10, 2015 (JP) .................................. 2015-046943

(51) Int. Cl.
| | | |
|---|---|---|
| *H04N 5/232* | (2006.01) | |
| *G06T 3/60* | (2006.01) | |
| *G06T 3/00* | (2006.01) | |
| *G06T 3/40* | (2006.01) | |
| *H04N 5/247* | (2006.01) | |
| *H04N 5/265* | (2006.01) | |

(52) U.S. Cl.
CPC ....... *H04N 5/23238* (2013.01); *G06T 3/0018* (2013.01); *G06T 3/0062* (2013.01); *G06T 3/4038* (2013.01); *G06T 3/60* (2013.01); *H04N 5/247* (2013.01); *H04N 5/265* (2013.01)

(58) Field of Classification Search
None
See application file for complete search history.

(56) References Cited

U.S. PATENT DOCUMENTS

| 6,164,808 A | 12/2000 | Shibata et al. |
| 6,466,831 B1 | 10/2002 | Shibata et al. |
| (Continued) | | |

FOREIGN PATENT DOCUMENTS

| CN | 102833525 A | 12/2012 |
| CN | 103703755 A | 4/2014 |
| (Continued) | | |

OTHER PUBLICATIONS

Extended European Search Report dated Jul. 19, 2016 in Patent Application No. 16159444.5.

(Continued)

*Primary Examiner* — Kaitlin A Retallick

(74) *Attorney, Agent, or Firm* — Xsensus LLP

(57) ABSTRACT

Two image processing systems and an image processing method are provided. One of the image processing systems includes a first unit configured to output a portion of input image data, a second unit configured to transform a coordinate of input image data, and a third unit configured to output the image data processed by the first unit and the second unit as video data to be displayed on a display. The other one of the image processing system further includes a fourth unit configured to combine input image data of a plurality of images to output one piece of image data. The image processing method includes outputting a portion of input image data, transforming a coordinate of input image data, and outputting the image data as video data to be displayed on a display.

20 Claims, 13 Drawing Sheets

(56) References Cited

U.S. PATENT DOCUMENTS

| | | | |
|---|---|---|---|
| 2006/0066730 A1* | 3/2006 | Evans, Jr. | H04N 5/2624 |
| | | | 348/218.1 |
| 2007/0206945 A1* | 9/2007 | DeLorme | G03B 41/00 |
| | | | 396/332 |
| 2008/0118180 A1 | 5/2008 | Kamiya et al. | |
| 2010/0111440 A1 | 5/2010 | Chai et al. | |
| 2010/0208032 A1* | 8/2010 | Kweon | G06T 1/00 |
| | | | 348/36 |
| 2011/0115879 A1* | 5/2011 | Homma | H04N 5/232 |
| | | | 348/36 |
| 2012/0032877 A1* | 2/2012 | Watkins, Jr. | G06F 1/1624 |
| | | | 345/156 |
| 2012/0063656 A1* | 3/2012 | Jao | G06T 3/0068 |
| | | | 382/128 |
| 2012/0106830 A1* | 5/2012 | Bama | G06T 7/42 |
| | | | 382/154 |
| 2012/0307001 A1 | 12/2012 | Osako et al. | |
| 2013/0222646 A1 | 8/2013 | Tsubota et al. | |
| 2014/0132708 A1 | 5/2014 | Kato | |
| 2014/0176542 A1 | 6/2014 | Shohara et al. | |
| 2015/0042647 A1 | 2/2015 | Shohara et al. | |
| 2016/0050369 A1 | 2/2016 | Takenaka et al. | |

FOREIGN PATENT DOCUMENTS

| | | | |
|---|---|---|---|
| CN | 103905761 A | 7/2014 | |
| JP | H08-278846 A | 10/1996 | |
| JP | 2005-056295 | 3/2005 | |
| JP | 2006-310975 | 11/2006 | |
| JP | 2008-129903 A | 6/2008 | |
| JP | 2012-029179 | 2/2012 | |
| JP | 2013-12181 A | 1/2013 | |
| JP | 2013-187860 | 9/2013 | |
| JP | 2013-198062 A | 9/2013 | |
| JP | 2014-165764 | 9/2014 | |
| JP | 2015-019344 | 1/2015 | |
| JP | 5843033 | 11/2015 | |
| JP | 5843034 | 11/2015 | |
| WO | WO 2010/051147 A2 | 5/2010 | |
| WO | WO-2013133456 A1 * | 9/2013 | ........ G06T 3/0062 |
| WO | WO 2015/030221 A1 | 3/2015 | |

OTHER PUBLICATIONS

Office Action dated Jun. 6, 2017 in Japanese Patent Application No. 2016-080181.

Japanse Office Action dated Nov. 2, 2015 for Japanese Application No. 2015-046943 filed on Mar. 10, 2015.

Japanse Office Action dated Jul. 21, 2015 for Japanese Application No. 2015-046943 filed on Mar. 10, 2015.

Office Action issued in corresponding Chinese Application No. 201610111895.5 dated Jul. 6, 2013.

\* cited by examiner

| POST-CONVERSION COORDINATE VALUE | | PRE-CONVERSION COORDINATE VALUE | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIRST PARTIAL-VIEW IMAGE

SPHERICAL IMAGE

SECOND PARTIAL-VIEW IMAGE

IMAGE PROCESSING SYSTEM AND IMAGE PROCESSING METHOD

CROSS-REFERENCE TO RELATED APPLICATION

This patent application is based on and claims priority pursuant to 35 U.S.C. § 119(a) to Japanese Patent Application No. 2015-046943, filed on Mar. 10, 2015, in the Japan Patent Office, the entire disclosure of which is hereby incorporated by reference herein.

BACKGROUND

Technical Field

Embodiments of the present invention relate to an image processing system and an image processing method.

Background Art

An omnidirectional imaging systems that uses a plurality of wide-angle lenses such as fish-eye lenses and super-wide-angle lenses to capture an omnidirectional image at a time is known (hereinafter, such an omnidirectional image is referred to as a spherical image) (see, for example, JP-2013-187860-A). Such an omnidirectional imaging system projects images from multiple lenses on the sensor plane, and joins these images together by image processing. Accordingly, a spherical image (omnidirectional image) is generated. For example, two wide-angle lenses that have angles of view of 180 degrees or wider may be used to generate a spherical image.

SUMMARY

Embodiments of the present invention described herein provide two image processing systems and an image processing method. One of the image processing systems includes a first unit configured to output a portion of input image data, a second unit configured to transform a coordinate of input image data and output resultant image data, and a third unit configured to output the image data processed by the first unit and the second unit as video data to be displayed on a display. The other one of the image processing system includes a first unit configured to output a portion of input image data, a second unit configured to transform a coordinate of input image data and output resultant image data, a fourth unit configured to combine input image data of a plurality of images to output one piece of image data, and a third unit configured to output the image data processed by the first unit, the second unit, and the fourth unit. The image processing method includes outputting a portion of input image data, transforming a coordinate of input image data to output resultant image data, and outputting the image data processed in the outputting and the transforming as video data to be displayed on a display.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
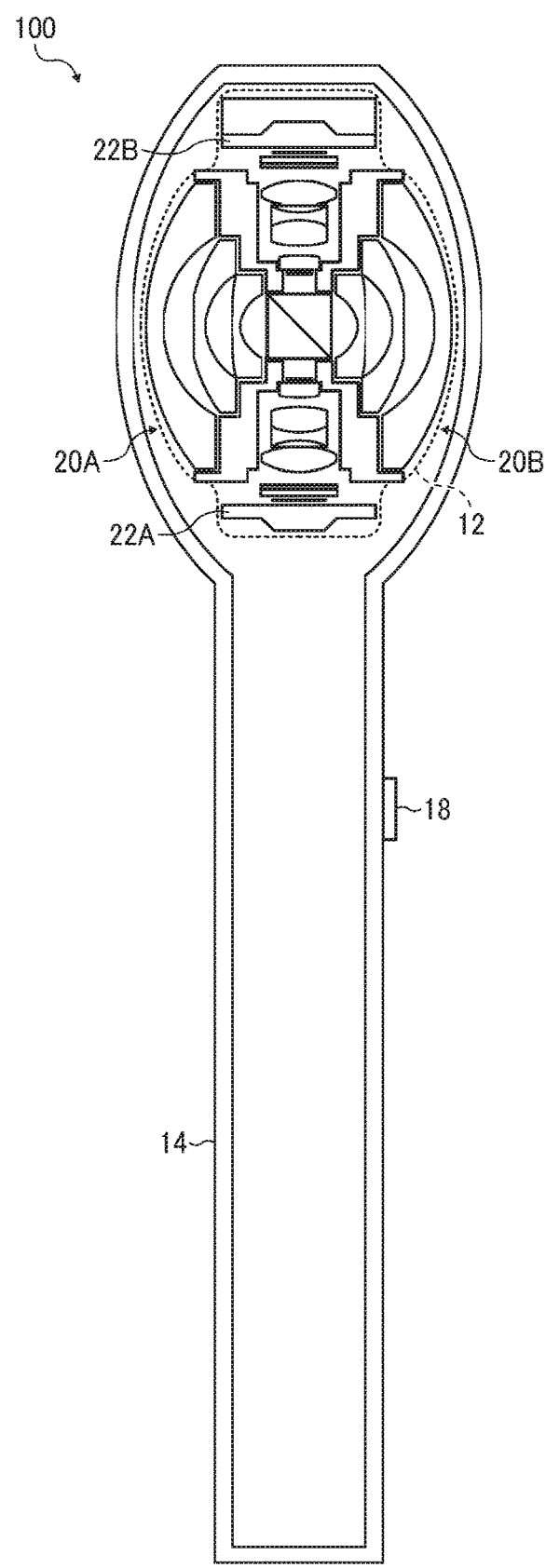
FIG. 1 is a sectional view of an omnidirectional camera according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present on are described below, but no limitation is indicated therein and various applications and modifications may be made without departing from the scope of the invention. In the embodiments described below, as an example of an image processing system and imaging system, an omnidirectional camera 100 including both image processing capability and imaging capability using two fish-eye lenses is described.

Hereinafter, the schematic configuration of an omnidirectional camera 100 according to the present embodiment is described with reference to FIG. 1 and FIG. 2. FIG. 1 is a sectional view of the omnidirectional camera 100 according to the present embodiment. The omnidirectional camera 100 illustrated in FIG. 1 includes an imaging body 12, a housing 14 holding the imaging body 12 and other components such as a controller board and a battery, and a shutter button 18 provided on the housing 14.

The imaging body 12 illustrated in FIG. 1 includes two image forming optical systems 20A and 20B and two imaging elements 22A and 22B. Each of the imaging elements 22A and 22B may be, for example, a charge-coupled device (CCD) sensor or a complementary metal oxide semiconductor (CMOS) sensor. Each of the image forming optical systems 20 is configured as a fish-eye lens consisting of, for example, seven elements in six groups. In the embodiment illustrated in FIG. 1, the above-mentioned fish-eye lens has a full angle of view of larger than 180 degrees (=360 degrees/n, where n denotes the number of optical systems and n is 2), preferably has an angle of view of 190 degrees or larger. Such a wide-angle combination of one of the image forming optical systems 20 and one of the imaging elements 22 is referred to as a wide-angle imaging optical system.

The relative positions of the optical elements (lenses, prisms, filters, and aperture stops) of the two image forming optical systems 20A and 20B are determined with reference to the imaging elements 22A and 22B. More specifically, positioning is made such that the optical axis of the optical elements of each of the image forming optical systems 20A and 20B is positioned at the central part of the light receiving area of corresponding one of the imaging elements 22 orthogonally to the light receiving area, and such that the light receiving area serves as the imaging plane of corresponding one of the fish-eye lenses.

In the embodiment illustrated in FIG. 1, the image forming optical systems 20A and 20B have the same specifications, and are combined in directions reverse to each other such that the optical axes thereof coincide with each other. The imaging elements 22A and 22B convert the light distribution of the received light into an image signal, and sequentially output image frames to the image processing block of the controller board. As will be described later in detail, the images captured by the respective imaging elements 22A and 22B are combined so as to generate an image over a solid angle of 4π steradian (hereinafter, such an image is referred to as a "spherical image"). The spherical image is obtained by photographing all the directions viewable from a photographing location. While it is assumed in the example embodiment described below that a spherical image is to be generated, a so-called panoramic image obtained by photographing 360 degrees only in a horizontal plane or an image that is a part of the image obtained by photographing omnidirectionaly or 360 degrees in a horizontal plane may also be generated. The spherical image may be stored as a still image or as moving images.

Figure 2:
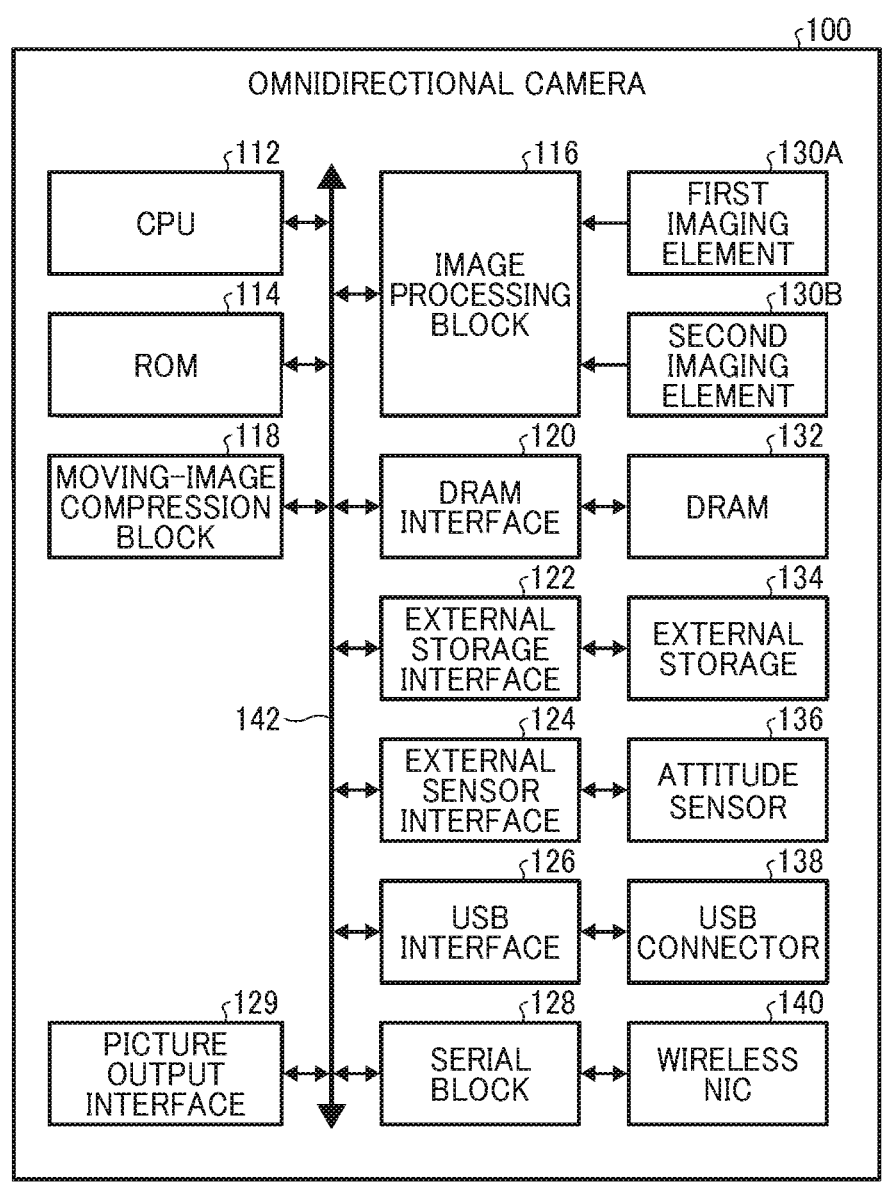
FIG. 2 is a block diagram of the hardware configuration of an omnidirectional camera according to an embodiment of the present invention.

FIG. 2 is a block diagram of the hardware configuration of the omnidirectional camera 100 according to the present embodiment. The omnidirectional camera 100 includes a central processing unit (CPU) 112, a read only memory (ROM) 114, an image processing block 116, a moving-image compression block 118, a dynamic random access memory (DRAM) 132 that is connected through a DRAM interface 120, and an attitude sensor 136 that is connected through an external sensor interface 124.

The CPU 112 controls the operations of components of the omnidirectional camera 100, or controls the overall operations of the omnidirectional camera 100, The ROM 114 stores therein a control program described in a code readable by the CPU 112 and various kinds of parameters. The image processing block 116 is connected to two imaging elements 130A and 130B (corresponding to the imaging elements 22A and 22B in FIG. 1), and receives image signals of images captured by the respective imaging elements 130A and 130B. The image processing block 116 includes, for example, an image signal processor (ISP), and applies, for example, shading correction, Bayer interpolation, white balance correction, and gamma correction to the image signals received from the imaging elements 130A and 130B. Further, the image processing block 116 combines the multiple images obtained from the imaging elements 130A and 130B to generate a spherical image as described above.

The moving-image compression block 118 is a codec block for compressing and expanding the moving images such as those in MPEG-4 AVC/H.264 format. The moving-image compression block 118 is used to store the video data of the generated spherical image, or to reproduce and output the stored video data. The DRAM 132 provides a storage area for temporarily storing data therein when various types of signal processing and image processing are applied.

The attitude sensor 136 is configured by an acceleration sensor, a gyroscope sensor, or a geomagnetic sensor, or the combination thereof, and is used to determine the attitude of the omnidirectional camera 100. For example, a three-axis acceleration sensor can detect acceleration components along three axes. For example, a three-axis gyroscope sensor can detect angular velocity along three axes. For example, a geomagnetic sensor can measure the direction of the magnetic field. Each of the outputs from these sensors may be used to obtain three attitude angles of the omnidirectional camera 100, or a combination of the outputs from these sensors may be used to obtain three attitude angles of the omnidirectional camera 100. The data that is obtained from the attitude sensor 136 is used to perform zenith correction on a spherical image. Moreover, the data that is obtained from the attitude sensor 136 may be used to perform image rotation according to a point of interest, as will be described later.

The omnidirectional camera 100 further includes an external storage interface 122, a universal serial bus (USB) interface 126, a serial block 128, and a picture output interface 129. The external storage interface 122 is connected to an external storage 134 such as a memory card inserted in a memory card slot. The external storage interface 122 controls reading and writing to the external storage 134.

The USB interface 126 is connected to a USB connector 138. The USB interface 126 controls USB communication with an external device such as a personal computer (PC) connected via the USB connector 138. The serial block 128 controls serial communication with an external device such as a PC, and is connected to a wireless network interface card (NIC) 140. The picture output interface 129 is an interface to connect to an external display such as a high-definition multimedia interface (HDMI, registered trademark), and can output an image to be recorded, an image being recorded, or a recorded image to such an external display as a picture.

Note that the USB connector 138, the wireless NIC 140, and the picture output interface 129 with the HDMI (registered trademark) are given as an example, but no limitation is intended thereby. In an alternative embodiment, connection to an external device may be established through a wired connection such as wired local area network (LAN), another wireless connection such as Bluetooth (registered trademark) and wireless USB, or through another picture output interface such as DisplayPort (registered trademark) and video graphics array (VGA).

When the power is turned on by the operation of a power switch, the control program mentioned above is loaded into the main memory. The CPU 112 follows the program read into the main memory to control the operations of the parts of the device, and temporarily stores the data required for the control in the memory. This operation implements functional units and processes of the omnidirectional camera 100, as will be described later.

As described above, the omnidirectional camera 100 according to the present embodiment is used to capture a still image of a spherical image or to record the moving images of a spherical image. In some cases, a special-purpose viewer that converts a spherical image into an image suitable for a planar device is used to view a recorded spherical image. On the other hand, there is a demand for displaying a spherical image captured by the omnidirectional camera 100 on a general-purpose viewer or display, which displays an input image just as it is, instead of a special-purpose viewer. There is also a demand for so-called live view, i.e., capturing an object while displaying it for check on the display connected to the camera.

However, if the omnidirectional camera 100 is provided with the processing equivalent to that of a special-purpose viewer, the instrumentation cost of the omnidirectional camera 100 increases, and the power consumption and the amount of heat generation in image processing also increase.

In order to avoid such situation, in the present embodiment, coordinate transformation is performed on a spherical image based on the point of interest determined by the data output from a sensor, and a portion of the spherical image on which the coordinate transformation has been performed is extracted. Accordingly, a displayed image to be output is generated. In a preferred embodiment, a center portion of the transformed spherical image is extracted to generate as a display image an image extracted from a spherical image around a point of interest.

According to the configuration described as above, a display image extracted from a spherical image, about which a viewer does not feel awkward, can be generated with a small amount of load. In a preferred embodiment, coordinate transformation is performed such that an image having a point of interest at the center is placed at a center portion of a spherical image where the amount of distortion is small. As a result, the image of the center portion is extracted and output as a display image. Accordingly, a viewer can view a natural-looking image without using a special-purpose viewer. Moreover, the coordinate transformation is integrated into the omnidirectional camera 100 for performing zenith correction, and no extra instrumentation cost is required for the omnidirectional camera 100. Further, the power consumption and the amount of heat generation in image processing can also be reduced.

In the present embodiment described below, it is configured such that a display image output to an external display connected through the picture output interface 129. However, no limitation is intended by such an embodiment. In an alternative embodiment, a user terminal device such as a smartphone or a tablet personal computer (PC) connected through a wired or wireless connection such as the USB connector 138 or the wireless NIC 140 may be used to display a spherical image. In such cases, an application of a general-purpose viewer operating on the user terminal device is activated, and the image output from the omnidirectional camera 100 can be displayed on the general-purpose viewer. In an alternative embodiment, a display image may be displayed on the display provided for the omnidirectional camera 100 when the omnidirectional camera 100 is provided with a display.

Figure 3:
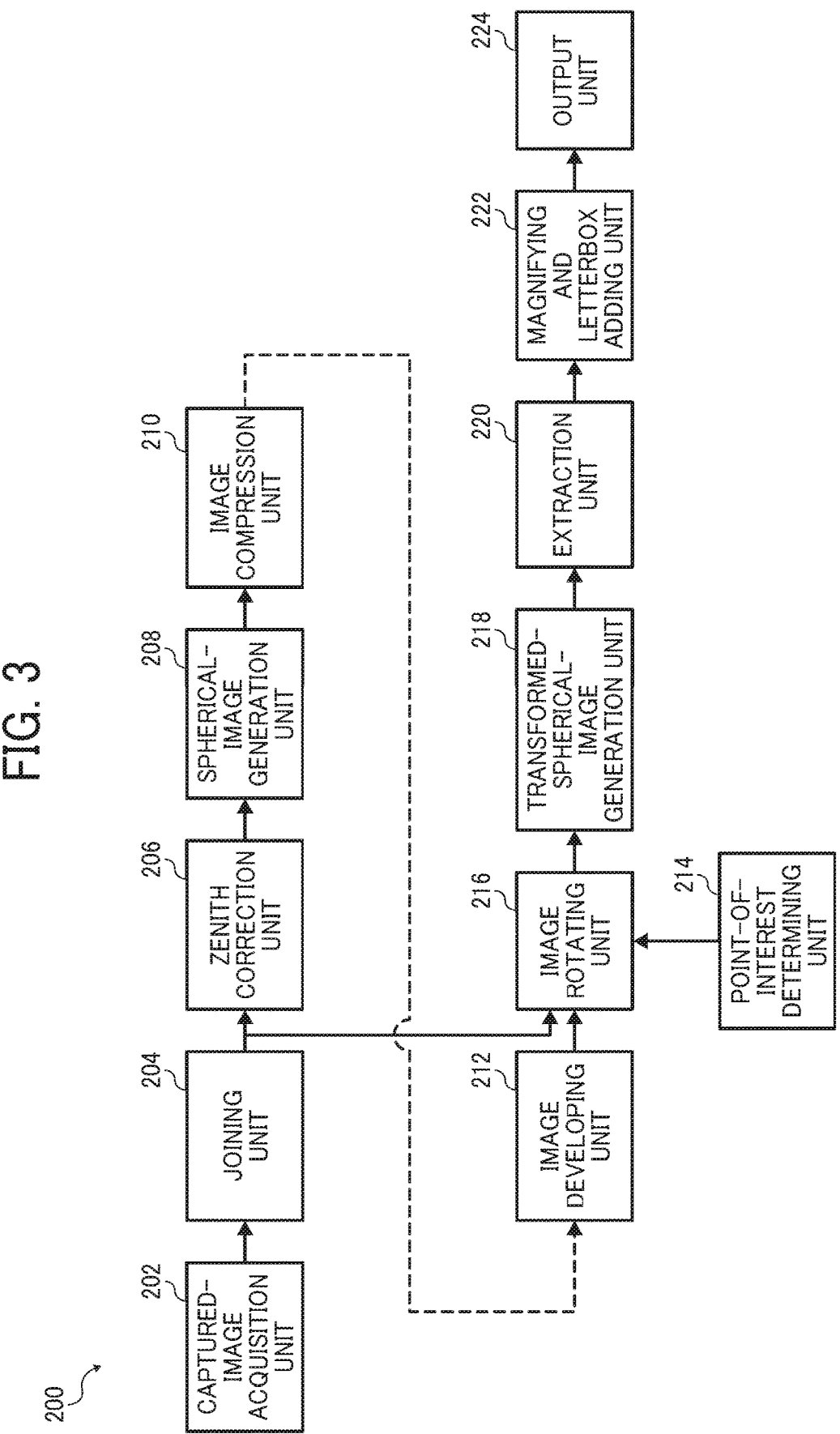
FIG. 3 is a diagram illustrating functional blocks related a display image outputting function implemented on an omnidirectional camera, according to an embodiment of the present invention.

Hereinafter, the display image outputting function of the omnidirectional camera 100 according to the present embodiment is described schematically with reference to FIG. 3, FIG. 4A, and FIG. 4B. FIG. 3 is a diagram illustrating functional blocks 200 related a display image outputting function implemented on the omnidirectional camera 100, according to the present embodiment.

As illustrated in FIG. 3, the functional block 200 of the omnidirectional camera 100 includes a captured-image acquisition unit 202, a joining unit 204, a zenith correction unit 206, a spherical-image generation unit 208, an image compression unit 210, an image developing unit 212, a point-of-interest determining unit 214, an image rotating unit 216, a transformed-spherical-image generation unit 218, an extraction unit 220, a magnifying and letterbox adding unit 222, and an output unit 224.

FIG. 3 illustrates two flows of image processing. In the first flow, a spherical image that is captured by the omnidirectional camera 100 is temporarily stored, and the display image of the stored spherical image is output in response to an operation made by a user. The image data of the stored spherical image may be a still image or moving images. The first flow corresponds to cases in which image data is viewed after the image data is recorded. In the second flow, the display image of a spherical image is generated and output while the omnidirectional camera 100 is capturing the spherical image. The second flow corresponds to cases in which the capturing state is viewed in real time before the image data is stored or while the image data is being stored.

Hereinafter, the first processing flow that corresponds to cases in which image data is viewed after the image data is recorded is firstly described. The captured-image acquisition unit 202 controls the two imaging elements 130A and 130B to obtain the captured image from each of the two imaging elements 130A and 130B. In the case of a still image, two captured images of one frame are obtained at the timing when the shutter is pressed. In the case of moving images, continuous frames are captured in succession, and two captured images are obtained for each of the frames. Each of the images captured by the imaging elements 130A and 130B is a fish-eye image that roughly covers a hemisphere of the whole sphere as a field of view, configures a partial-view image of the omnidirectional image. Hereinafter, each one of the images captured by the imaging elements 130A and 130B may be referred to as a partial-view image.

The joining unit 204 detect the joining position of the obtained two partial-view images, and joins the two partial-view images at the detected joining position. In the joining position detection process, the amount of displacement among a plurality of corresponding points in an overlapping area of the multiple partial-view images is detected for each frame.

The zenith correction unit 206 controls the attitude sensor 136 illustrated in FIG. 2 to detect the attitude angle of the omnidirectional camera 100, and corrects the generated spherical image (omnidirectional image) such that the zenith direction of the spherical image matches a prescribed reference direction. Typically, the prescribed reference direction refers to a vertical direction in which the acceleration of gravity is applied. By correcting the generated spherical image such that the zenith direction of the spherical image matches the vertical direction (i.e., the direction towards the sky), the possibility of causing awkwardness such as simulator sickness to a user can be prevented even when the field of view is changed while an image is being viewed. Such prevention of awkwardness such as simulator sickness is effective particularly in moving images.

The spherical-image generation unit 208 generates a spherical image from two captured partial-view images in view of the processing results of the joining unit 204 and the zenith correction unit 206. In the embodiment described below, a conversion parameter is used to generate a spherical image from two partial-view images, and the joining unit 204 reflects the result of the joining position detection in the conversion parameter. The zenith correction unit 206 reflects the result of the zenith correction in the conversion parameter. Then, the spherical-image generation unit 208 uses the conversion parameter that reflects these results of processing to generate a spherical image from two partial-view images. By so doing, the load of processing for obtaining a final spherical image can be reduced.

However, no limitation is intended thereby. For example, two partial-view images may be joined together to generate a spherical image, and zenith correction is performed on the generated spherical image. A spherical image on which zenith correction has been performed may be generated in this manner. Note that the conversion parameter will be described later in detail.

The image compression unit 210 includes a still-image compressing block, and when a still image is captured, the image compression unit 210 compresses the captured still image into image data of a prescribed still-image fat mat such as a Joint Photographic Experts Group (JPEG) format. The image compression unit 210 also includes the moving-image compression block 118 as illustrated in FIG. 2, and when moving images are recorded, the image compression unit 210 compresses the recorded continuous image frames into image data of a prescribed moving-image format. No limitation is intended hereby, but the moving-image compressed format includes various types of formats such as H.264/Moving Picture Experts Group (MPEG)-4 advanced video coding (AVC), H.265/High Efficiency Video Coding (HEVC), Motion JPEG, and Motion JPEG 2000. The generated image data is stored in a storage device such as the external storage 134 provided for the omnidirectional camera 100 or a flash memory provided for the omnidirectional camera 100.

In the first processing flow, the functional units 212 to 224 operate, for example, in response to picture output instructions made through the omnidirectional camera 100. Here, the picture output instructions specify an object to be reproduced. The image developing unit 212 reads the image data stored in the storage device to obtain to obtain a spherical image. The obtained spherical image is developed in a memory.

The point-of-interest determining unit 214 determines a point-of-interest based on the data output from the attitude sensor 136. In the first processing flow, the omnidirectional camera 100 no longer performs any imaging operation in the following picture output processes. Accordingly, the omnidirectional camera 100 may be used as an operation controller that controls the point of interest. Based on the data output from the attitude sensor 136, the points of interest (i.e., the attitude angles of the camera α, β, and γ) that indicate the direction in which the omnidirectional camera 100 points are determined. The point-of-interest determining unit 214 may serve as a decision unit according to the present embodiment.

In the first processing flow, the zenith correction has already been performed on the spherical image to be displayed. For this reason, although no limitation is intended thereby, the attitude angles of the omnidirectional camera 100 can be defined with reference to the state in which the omnidirectional camera 100 as an operation controller points the right above the state in which the omnidirectional camera 100 as illustrated in FIG. 1 is vertically oriented such that the imaging body 12 points the upward). In the embodiment described below, the omnidirectional camera 100 is used as an operation controller. However, an external device that includes an attitude sensor such as a dedicated-to-operation controller, a smartphone, a tablet PC, and a head-mounted display and can communicate with the omnidirectional camera 100 may separately be provided as an operation controller.

The image rotating unit 216 performs coordinate transformation on a spherical image based on the point of interest determined by the point-of-interest determining unit 214. More specifically, the coordinate transformation indicates the processing in which the coordinates of the omnidirectional image are three-dimensionally and rotationally transformed according to the angle that corresponds to the points of interest. Note that the coordinate transformation will be described later in detail. The image rotating unit 216 may serve as a coordinate transformation unit according to the present embodiment.

The transformed-spherical-image generation unit 218 generates from an original spherical image a transformed spherical image that corresponds to a point of interest, based on the result of the coordinate transformation. The transformed-spherical-image generation unit 218 may serve as an image generation unit according to the present embodiment. FIG. 4A is a diagram illustrating an example of transformed spherical image generated in the omnidirectional camera 100, according to the present embodiment. The coordinates of the transformed spherical image are transformed such that the point of interest is laid out at the center of the image. Accordingly, the center point of the spherical image illustrated in FIG. 4A corresponds to the determined point of interest.

The extraction unit 220 extracts a portion of the transformed spherical image on which the coordinate transformation has been performed, to generate an extracted image. In a preferred embodiment, the extraction unit 220 extracts a center portion of the transformed spherical image. Accordingly, an image of certain size is extracted from the spherical image around the point of interest. In FIG. 4A, the center portion that is to be extracted from the spherical image is indicated by the broken line in a rectangular shape. The extraction unit 220 may serve as an extraction unit according to the present embodiment.

Note that in the embodiment described below, the extraction unit is used to extract a portion of an image to generate an extracted image. However, in an alternative embodiment, the extraction unit may also reduce the resolution in addition to the function of extracting a portion of an image to generate an extracted image. In the embodiment described below, the processing of the extraction unit 220 is performed after the image rotating unit 216 performs the processing. However, no limitation is intended thereby and the order of the processing may vary.

The magnifying and letterbox adding unit 222 magnifies the image extracted by the extraction unit 220 according to the resolution and aspect ratio of the destination device such as a display or the resolution and aspect ratio of the picture output device such as a projector, and adds black letterboxes to the upper and lower portions of the magnified extracted image. Accordingly, a display image is generated. The output unit 224 outputs through the picture output interface 129 the display image that is processed and generated by the magnifying and letterbox adding unit 222. Note that when the extracted image has the resolution and aspect ratio consistent with those of the picture output device, the processing of the magnifying and letterbox adding unit 222 may be omitted.

Figure 4A:
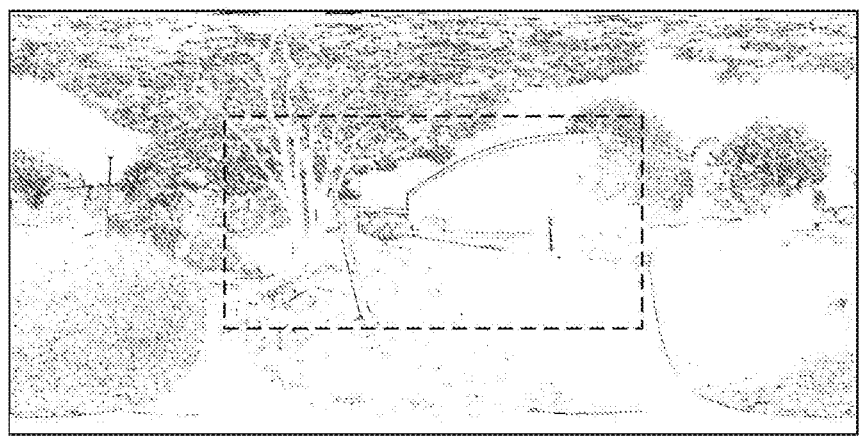
FIG. 4A is a diagram illustrating an example of transformed spherical image in an omnidirectional camera, according to an embodiment of the present invention.
Figure 4B:
FIG. 4B is a diagram illustrating an example of generated display image in an omnidirectional camera, according to an embodiment of the present invention.

FIG. 4B illustrates a display image output from the output unit 224 based on the spherical image illustrated in FIG. 4A, in the omnidirectional camera 100 according to the present embodiment. As illustrated in FIG. 4A, the peripheral area of the spherical image is distorted to a large degree, but the center portion of the spherical image is relatively less distorted. For this reason, as illustrated in FIG. 4B, a display image that is generated by extracting the center portion becomes a natural-looking image for a viewer.

In the cases of a still image, the picture output processes by the functional units 214 to 224 are repeatedly performed on a same spherical image at least every time the point of interest is changed. Typically, the picture output processes are performed at prescribed intervals. The display image is updated according to the point of interest at that time. In the cases of moving images, typically, the picture output processes by the functional units 212 to 224 are repeatedly performed for each frame, and the display image is updated.

The omnidirectional camera 100 that serves as an operation controller is inclined or rotated towards the front, rear and sides of the omnidirectional camera 100 with reference to the state in which the omnidirectional camera 100 is oriented to the upward direction, and the point of interest is changed accordingly. As a result, the display image of a spherical image can be viewed according to the changed point of interest.

Secondly, the second processing flow that corresponds to cases in which image data is viewed in real time before the image data is recorded or while the image data is being recorded is described with reference to FIG. 3. In the second processing flow, the functional units 202, 204, and 214 to 224 operate in response to instructions for starting the live viewing.

In a similar manner to the first processing flow, the captured-image acquisition unit 202 controls the two imaging elements 130A and 130B to obtain for each frame two partial-view images from each of the two imaging elements 130A and 130B. Then, the captured-image acquisition unit 202 develops the obtained two partial-view images in a memory. The joining unit 204 detect the joining position of the obtained two partial-view images, and reflects the result of the joining position detection in the conversion parameter.

The point-of-interest determining unit 214 determines a point-of-interest based on the data output from the attitude sensor of the operation controller. In the second processing flow, the omnidirectional camera 100 still performs imaging operation in the following picture output processes. For this reason, an operation controller that controls the point of interest needs to be provided separately. In the present embodiment, an external device that includes an attitude sensor such as a dedicated-to-operation controller, a smartphone, a tablet PC, and a head-mounted display and can communicate with the omnidirectional camera 100 can be used as an operation controller. Based on the data output from the attitude sensor of the operation controller, the points of interest (i.e., the attitude angles of the operation controller $\alpha$, $\beta$, and $\gamma$) that indicate the direction in which the operation controller points are obtained.

The image rotating unit 216 performs coordinate transformation on a spherical image based on the point of interest determined by the point-of-interest determining unit 214. More specifically, the image rotating unit 216 three-dimensionally and rotationally transforms the coordinates of the spherical image according to the angle that corresponds to point of interest. The result that is obtained by the image rotating unit 216 is reflected in a conversion parameter used to generate a spherical image from two partial-view images.

The transformed-spherical-image generation unit 218 combines the obtained two captured partial-view images using, the conversion parameter that reflects the result of the processing performed by the joining unit 204 and the image rotating unit 216, to generate a transformed spherical image in a direct manner.

In the second processing flow, the attitude of the omnidirectional camera 100 that captures a spherical image may also change in addition to the attitude of the operation controller that controls a point of interest. For this reason, it is desired that the image rotating unit 216 perform the three-dimensional and rotational transformation in view of the zenith correction that is performed according to the attitude of the omnidirectional camera 100. For example, when the omnidirectional camera 100 and the operation controller point the upward direction, the reference is defined such that the zenith of the spherical image matches the direction of gravity (i.e., the direction towards the sky), and the three-dimensional and rotational transformation is performed.

Next, in a similar manner to the first processing flow, the extraction unit 220 extracts a portion of the transformed spherical image to generate an extracted image. Then, the magnifying and letterbox adding unit 222 magnifies the image extracted by the extraction unit 220, and adds a black letterbox to the magnified extracted image. The output unit 224 outputs through the picture output interface 129 the display image that is processed and generated by the magnifying and letterbox adding unit 222. The processes of the functional units 202, 204, and 214 to 224 are repeatedly performed for each frame.

In the second processing flow, for example, capturing may be performed upon fixing the position of the omnidirectional camera 100. In such cases, the external operation controller is inclined or rotated towards the front, rear and sides of the operation controller with reference to the state in which the operation controller is oriented to the upward direction, and the point of interest is changed accordingly. As a result, the live viewing of a spherical image can be achieved according to the changed point of interest. Note that in the above description, the zenith correction of the omnidirectional camera 100 is reflected in the rotational transform. Accordingly, regardless of the inclination of the omnidirectional camera 100 with reference to the vertical direction, the attitude of the operation controller can be changed and it becomes easier to determine a point of interest through intuition reference to the direction of gravity sensed by a user. However, no limitation is intended thereby. In an alternative embodiment, a point of interest may be controlled only by the attitude of an operation controller without performing zenith correction according to the attitude of the omnidirectional camera 100.

Figure 5:
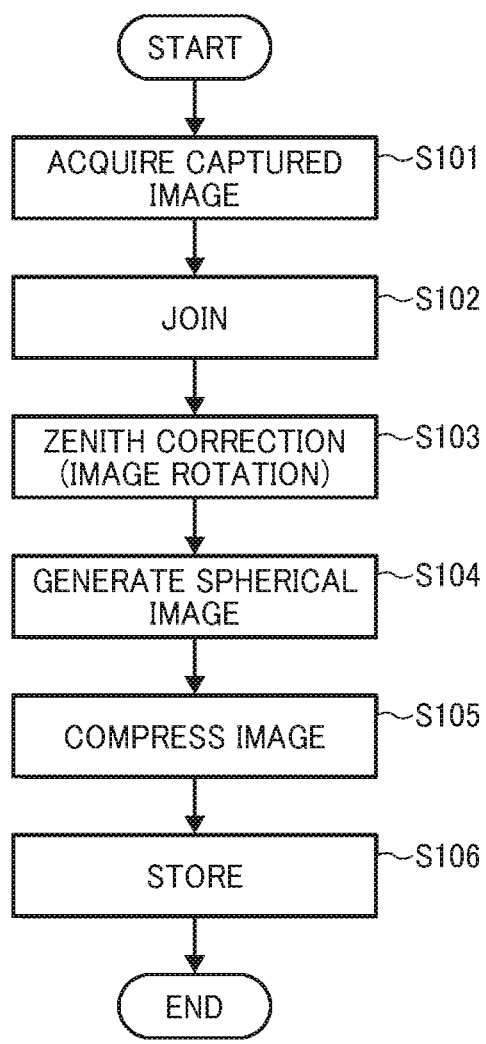
FIG. 5 is a flowchart of the storing process in a first processing flow performed by an omnidirectional camera, according to an embodiment of the present invention.
Figure 6:
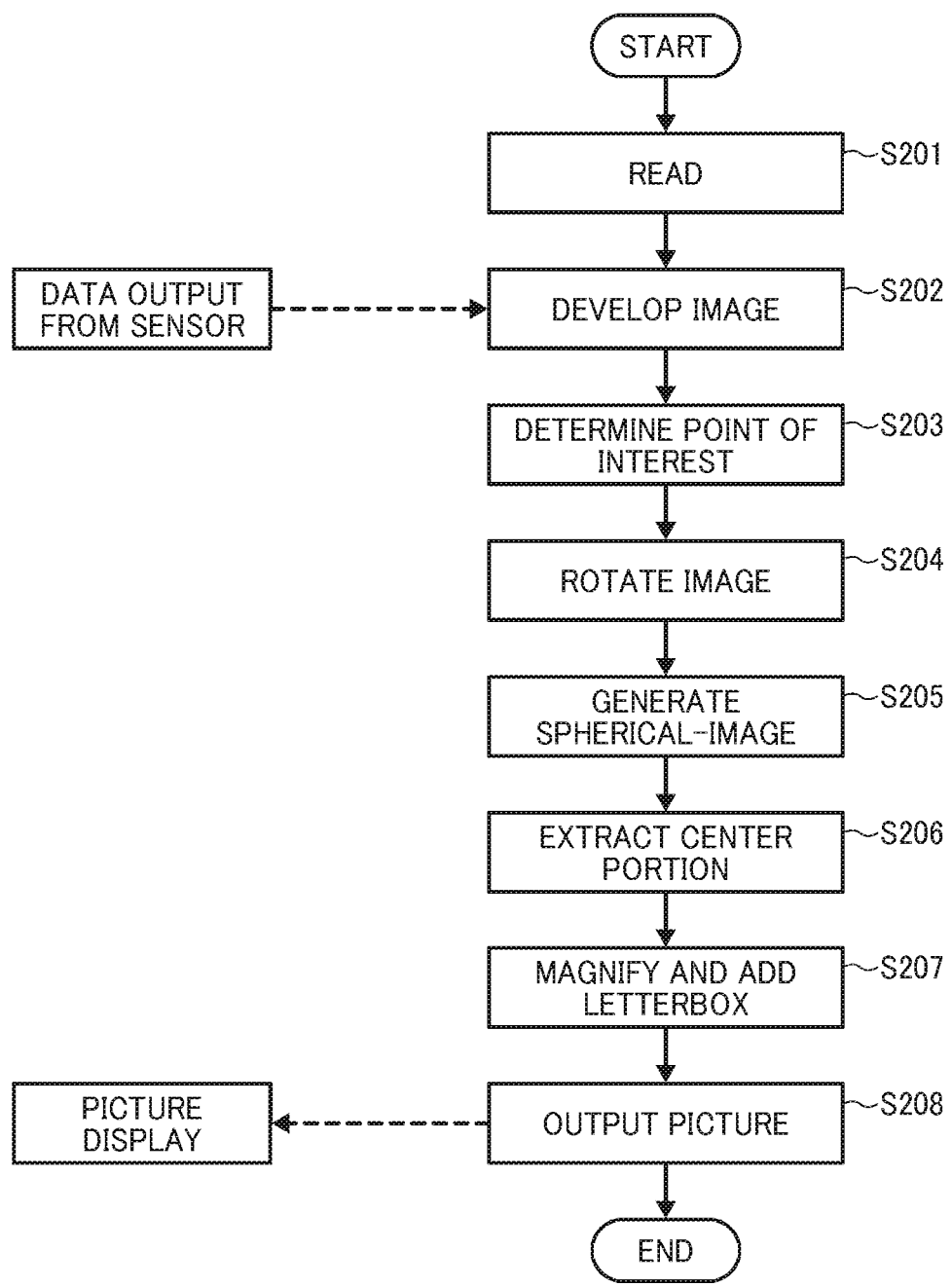
FIG. 6 is a flowchart of the display-image outputting process in a first processing flow performed by an omnidirectional camera, according to an embodiment of the present invention.
Figure 7:
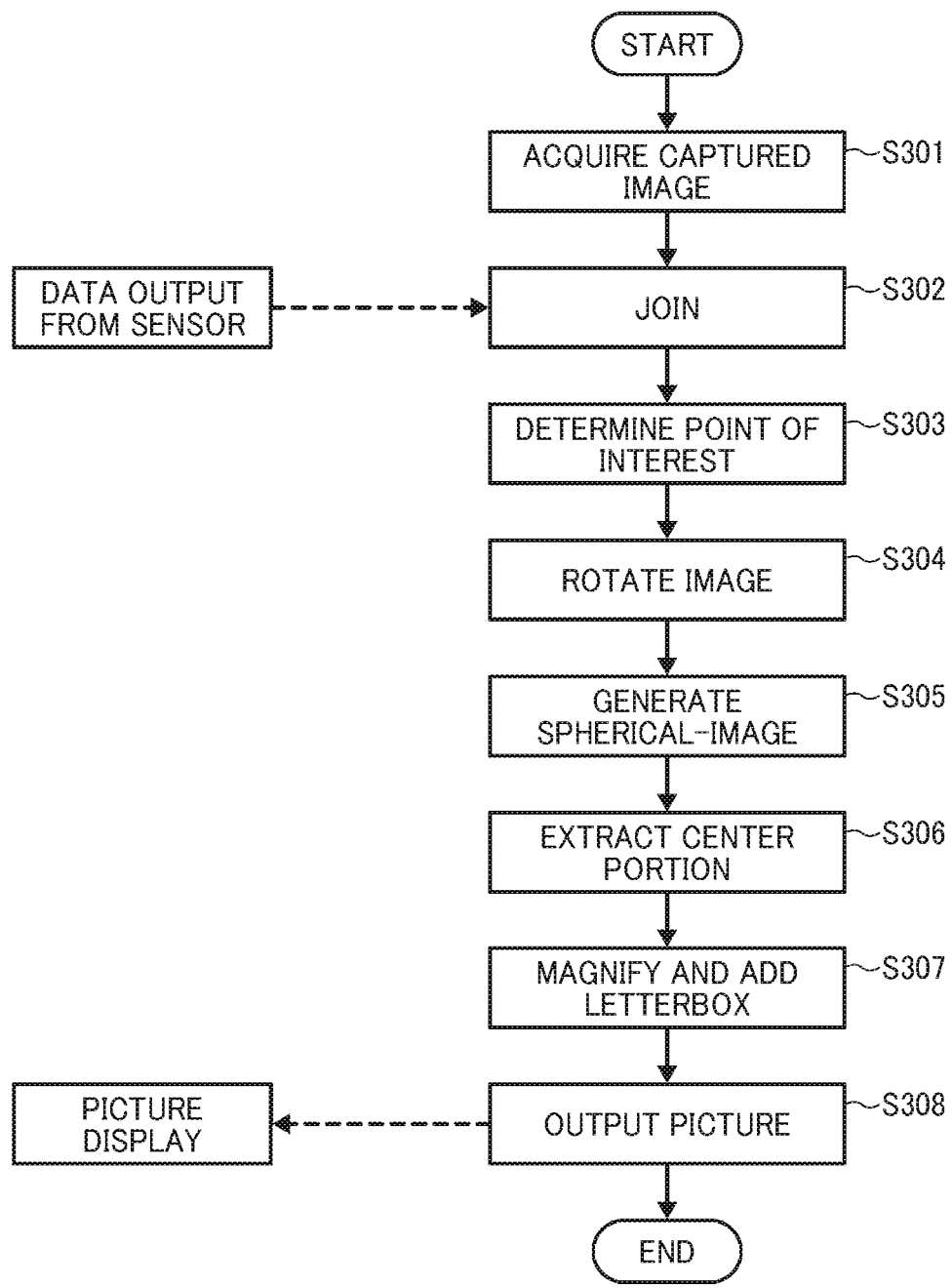
FIG. 7 is a flowchart of the display-image outputting process in a second processing flow performed by an omnidirectional camera, according to an embodiment of the present invention.

Hereinafter, the display image outputting function of the omnidirectional camera 100 according to the present embodiment is described in detail with reference to FIG. 5 to FIG. 13C. FIG. 5 and FIG. 6 are flowcharts of the storing process and the display-image outputting process in a first processing flow performed by the omnidirectional camera 100, according to the present embodiment. FIG. 7 is a flowchart of the display-image outputting process in a second processing flow performed by the omnidirectional camera 100, the present embodiment.

Hereinafter, the processes that are performed in the first processing flow are described with reference to FIG. 5 and FIG. 6. The recording processes as depicted in FIG. 5 start in response to instructions for storage processes such as the depression of a shutter button. Note that the processes FIG. 5 and FIG. 6 correspond to cases in which a still image is captured and viewed. In a step S101, the omnidirectional camera 100 uses the captured-image acquisition unit 202 to obtain the captured image from each of the two imaging elements 130A and 130B.

Figure 8A:
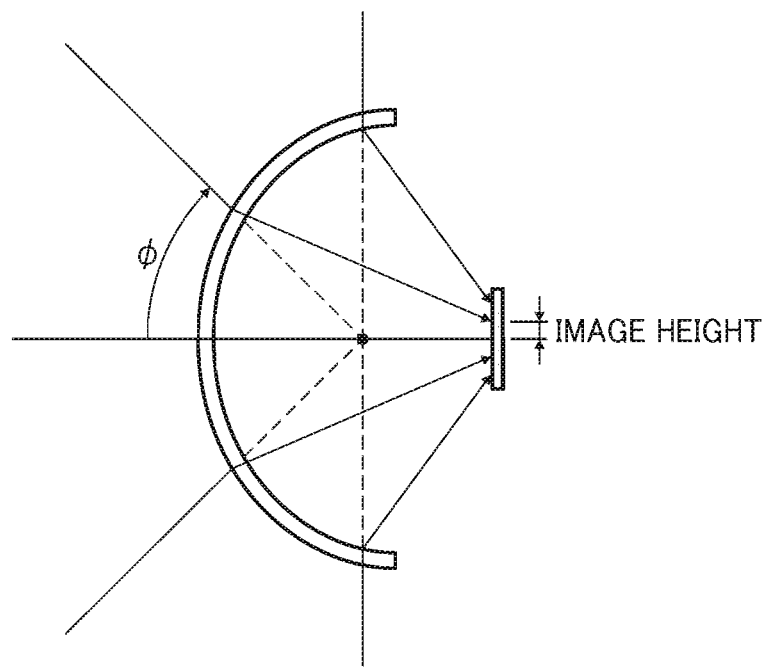
FIG. 8A and FIG. 8B are diagrams illustrating a projection relation in an omnidirectional camera, according to an embodiment of the present invention.
Figure 8B:
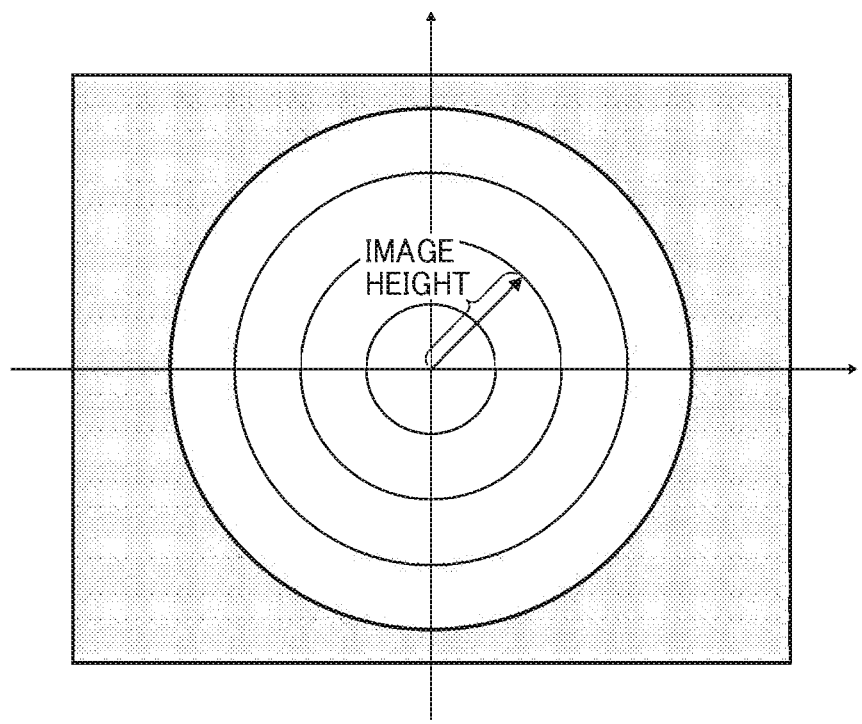

FIG. 8A and FIG. 8B are diagrams illustrating a projection relation in the omnidirectional camera 100, according to the present embodiment. In the present embodiment, an image captured by one fish-eye lens is an image obtained by capturing an orientation range of substantially a hemisphere with reference to a photographing location. As illustrated in FIG. 8A, the fish-eye lens generates an image having an image height h that corresponds to an angle of incidence $\varphi$ with reference to the optical axis. The relation between the image height h and the angle of incidence $\varphi$ is determined by a projection function according to a prescribed projection model.

The projection function varies according to the properties of the fish-eye lens. The projection model may be any of the equidistant projection (h=f*$\varphi$), the central projection (h=f*tan $\varphi$), the stereographic projection (h=2f*tan ($\varphi$/2)), the equi-solid-angle projection (h=2*tan ($\varphi$/2)), and the orthogonal projection (h=f*sin $\varphi$). In any of the projections, the image height h of a formed image is determined according to the incident angle $\varphi$ and the focal length f with reference to the optical axis. In the present embodiment, the configuration of a so-called circular fish-eye lens that has an image circle diameter shorter than a diagonal line of the image is adopted. As illustrated in FIG. 8B, the partial-view image obtained from the lens is a planar image including the entire image circle obtained by projecting the captured range of substantially a hemisphere.

Figure 9A:
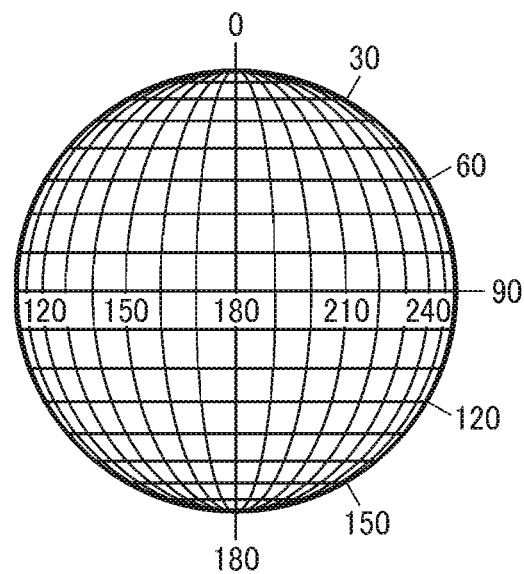
FIG. 9A and FIG. 9B are diagrams illustrating the data structure of the image data of a spherical image (omnidirectional image), according to an embodiment of the present invention.
Figure 9B:
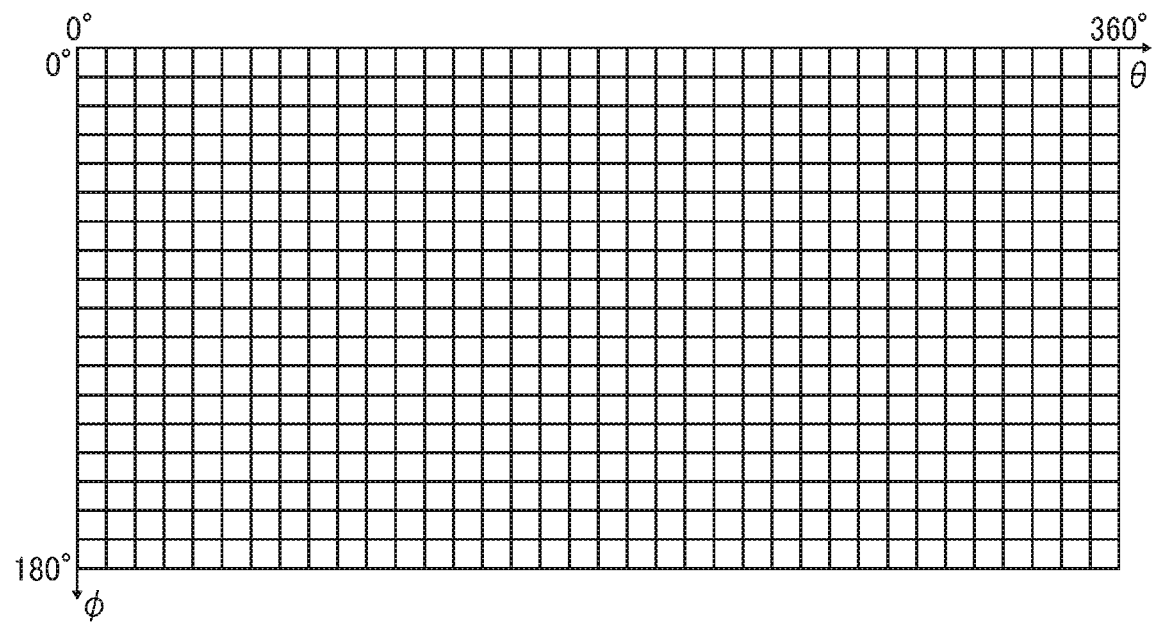

FIG. 9A and FIG. 9B are diagrams illustrating the data structure of the image data of a spherical image (omnidirectional image), according to the present embodiment. As illustrated in FIG. 9A and FIG. 9B, the format of a spherical image is expressed as an array of pixel values where the vertical angle $\varphi$ corresponding to the angle with reference to a certain axis and the horizontal angle $\theta$ corresponding to the angle of rotation around the axis are the coordinates. The coordinate values ($\theta$, $\varphi$) are associated with the points on the spherical surface indicating all directions around the photographing location, and the all directions are mapped on the spherical image (omnidirectional image).

Figures 10A, 10B:
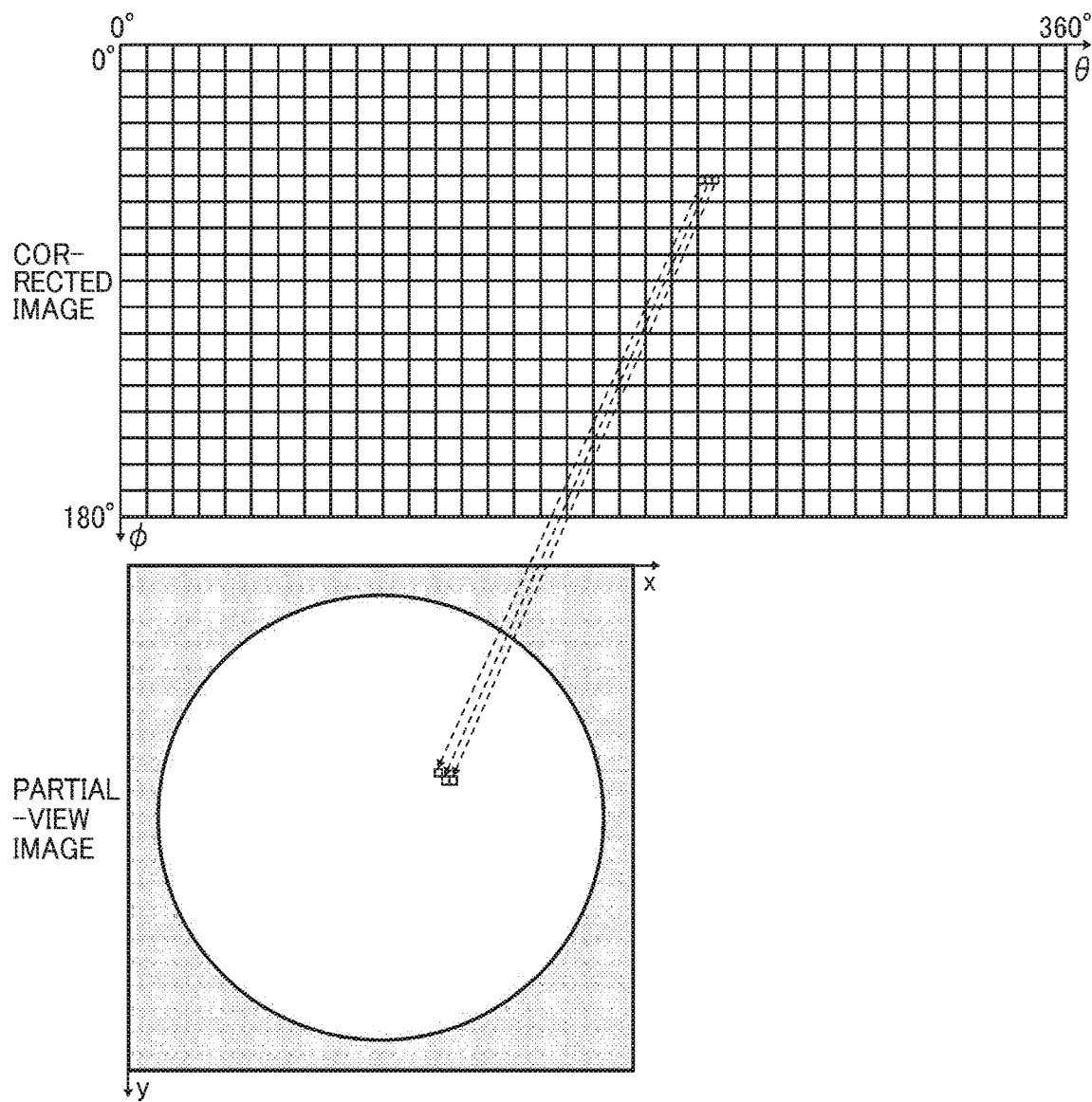
FIG. 10A and FIG. 10B are diagrams illustrating a conversion parameter used by an omnidirectional camera, according to an embodiment of the present invention.

FIG. 10A and FIG. 10B are diagrams illustrating the conversion parameter used by the omnidirectional camera 100, according to the present embodiment. The conversion parameter provides for the projection of partial-view images expressed in a planar coordinate system as an image expressed in a spherical coordinate system. As illustrated in FIG. 10A and FIG. 10B, for each fish-eye lens, the conversion parameter provides for the associating information between the coordinate values ($\theta$, $\varphi$) of the post-correction images and the coordinate values (x, y) of the pre-correction partial-view images that are mapped on the coordinate values ($\theta$, $\varphi$), for all the coordinate values ($\theta$, $\varphi$). In the illustration of FIG. 10A and FIG. 10B, the angle of each one of the pixels is one-tenths of a degree in both $\varphi$ direction and $\theta$ direction, and the conversion parameter includes the data indicating the 3600×1800 corresponding relation for each fish-eye lens. The original conversion parameter may be created by calculating and tabulating the value upon correcting the distortion from an optimal lens model in advance by a manufacturer or the like.

Here, FIG. 5 is referred to again. In a step S102, the omnidirectional camera 100 uses the joining unit 204 to detect the joining position of the obtained two partial-view images in the overlapping area and reflect the result of the joining position detection in the conversion parameter. Due to the reflection of the result of the joining position detection, the conversion parameters as depicted in FIG. 10A are corrected such that the coordinate values (x, y) of the partial-view image in which the correction of the joining position is reflected corresponds to the coordinate values ($\theta$, $\varphi$) of the post-correction images.

In a step S103, the omnidirectional camera 100 uses the zenith correction unit 206 to detect the attitude angle of the omnidirectional camera 100 with reference to the direction of gravity, and corrects the conversion parameter such that the zenith direction of the generated spherical image matches the vertical direction. The zenith correction can be performed in a similar manner to the three-dimensional and rotational transformation as will be described later in detail. The detailed description of the zenith correction is not given here. In a step S104, the omnidirectional camera 100 uses the spherical-image generation unit 208 to generate a spherical image from two captured partial-view images using the conversion parameter. In the step S104, firstly, the conversion parameter is used to convert the coordinate system of a partial-view image from a planar coordinate system to a spherical coordinate system. Then, the two partial-view images of a spherical coordinate system are combined with each other to generate a spherical image.

Figure 11A:
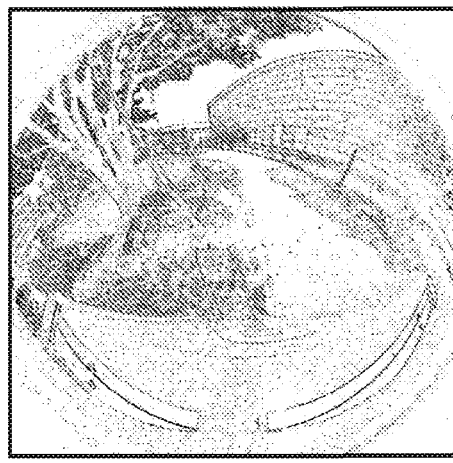
FIG. 11A, FIG. 11B, and FIG. 11C are diagrams illustrating a spherical image generated from two partial-view images in an omnidirectional camera, according to an embodiment of the present invention.
Figure 11B:
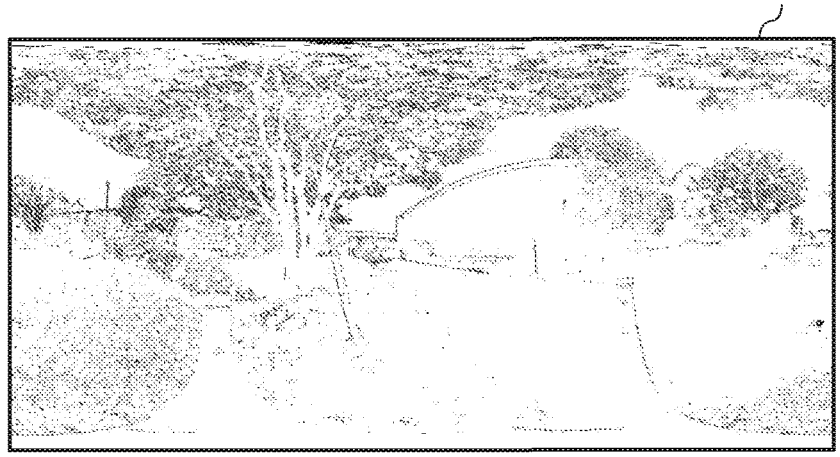
Figure 11C:
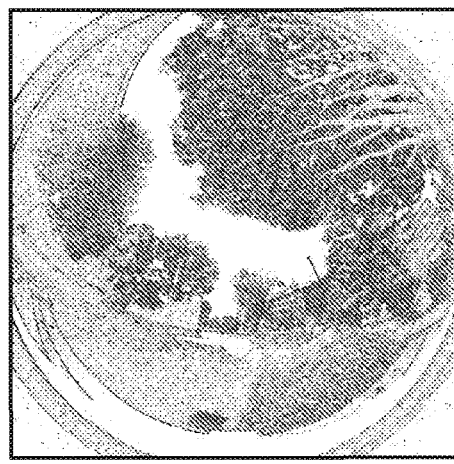

FIG. 11A, FIG. 11B, and FIG. 11C are diagrams illustrating a spherical image generated from two partial-view images in the omnidirectional camera 100, according to the present embodiment. FIG. 11A and FIG. 11C illustrate two partial-view images that are captured in a state where the upward direction of the omnidirectional camera 100 does not match the vertical line. FIG. 11B illustrates the spherical image generated by performing the zenith correction on these two partial-view images illustrated in FIG. 11A and FIG. 11C. In the example illustrated in FIG. 11A, FIG. 11B, and FIG. 11C, the omnidirectional camera 100 is inclined such that one of the fish-eye lenses is oriented towards the ground and the other one of the fish-eye lenses is oriented towards the sky, and the first and second partial-view images are captured. As understand from FIG. 11A, FIG. 11B, and FIG. 11C, the omnidirectional image is corrected by the zenith correction as described above such that the horizontal line in the scene is at the center of the spherical image.

Here, FIG. 5 is referred to again. In a step S105, the omnidirectional camera 100 uses the image compression unit 210 to compress the image data of the generated spherical image. In a step S106, the omnidirectional camera 100 stores the generated image data in the storage device. Then, the process is terminated.

The display-image outputting process as depicted in FIG. 6 starts in response to picture output instructions that specify the image data. In a step S201, the omnidirectional camera 100 uses the image developing unit 212 to read the image data of the specified spherical image from the storage device. In a step S202, the omnidirectional camera 100 uses the image developing unit 212 to develop the spherical image in a memory.

In a step S203, the omnidirectional camera 100 uses the point-of-interest determining unit 214 to determine the point-of-interests (i.e., the attitude angles of the camera α, β, and γ) based on the data output from the attitude sensor 136 of the omnidirectional camera 100. In the present embodiment, the acceleration sensor, the gyroscope sensor, and the geomagnetic sensor are used in a combined manner to obtain the attitude angles of the camera α, β, and γ with reference to the state in which the camera is oriented towards the upward direction. In a step S204, the omnidirectional camera 100 uses the image rotating unit 216 to perform coordinate transformation on a spherical image based on the point of interest determined in the step S203. In the coordinate transformation of the step S204, the coordinate values (θ1, φ1) of the spherical image are used as the input values to perform the coordinate transformation. Accordingly, the transformed coordinate values (θ2, φ2) are obtained.

Figure 12:
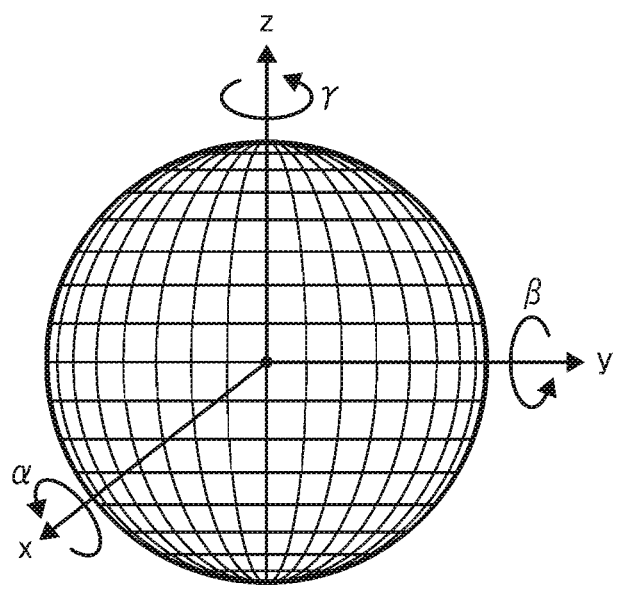
FIG. 12 is a diagram illustrating the coordinate transformation performed by an omnidirectional camera, according to an embodiment of the present invention.

Here, the coordinate transformation is described in detail. FIG. 12 is a diagram illustrating the coordinate transformation performed by the omnidirectional camera 100, according to the present embodiment. In the present embodiment, the three-dimensional rectangular coordinates and spherical coordinates before performing coordinate transformation are expressed as (x1, y1, z1) and (θ1, φ1), respectively. In a similar manner, the three-dimensional rectangular coordinates and spherical coordinates after performing coordinate transformation are expressed as (x2, y2, z2) and (θ2, φ2), respectively.

In the coordinate transformation, the following formulas (1) to (6) are used to transform the spherical coordinates (θ1, φ1) into the spherical coordinates (θ2, φ2). The coordinate transformation includes the coordinate transformation that corresponds to the formulas (1) to (3), the coordinate transformation that corresponds to the formula (4), and the coordinate transformation that corresponds to the formulas (5) and (6).

$$x1 = \sin(\phi1)\cos(\theta1) \quad (1)$$

$$y1 = \sin(\phi1)\sin(\theta1) \quad (2)$$

$$z1 = \cos(\phi1) \quad (3)$$

$$\begin{pmatrix} x2 \\ y2 \\ z2 \end{pmatrix} = \begin{pmatrix} 1 & 0 & 0 \\ 0 & \cos\alpha & \sin\alpha \\ 0 & -\sin\alpha & \cos\alpha \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} \cos\gamma & \sin\gamma & 0 \\ -\sin\gamma & \cos\gamma & 0 \\ 0 & 0 & 1 \end{pmatrix} \begin{pmatrix} x1 \\ y1 \\ z1 \end{pmatrix} \quad (4)$$

$$\phi2 = \text{Arccos}(z2) \quad (5)$$

$$\theta2 = \text{Arctan}\left(\frac{y2}{x2}\right) \quad (6)$$

Firstly, the rotational transform is to be performed using the three-dimensional rectangular coordinates. The formulas (1) to (3) as described above are used to transform the spherical coordinates (θ1, φ1) into the three-dimensional rectangular coordinates (x1, y1, z1).

Secondly, the attitude angles α, β, and γ of the omnidirectional camera, which are given as a point of interest, are used to transform the three-dimensional rectangular coordinates (x1, y1, z1) into three-dimensional rectangular coordinates (x2, y2, z2), using the formula (4). In other words, the formula (4) defines the attitude angles (α, β, and γ). More specifically, when the formula (4) is used, the original coordinates are rotated around the x axis by α, rotated around the y axis by β, and are rotated around the z axis by γ. Accordingly, transformed coordinates are obtained.

Finally, the formulas (5) and (6) are used to turn the transformed three-dimensional rectangular coordinates (x2, y2, z2) back to the spherical coordinates (θ2, φ2).

Here, FIG. 6 is referred to again. In a step S205, the omnidirectional camera 100 uses the transformed-spherical-image generation unit 218 to generate from the original spherical image a transformed spherical image that corresponds to a point of interest, based on the result of the coordinate transformation. In the coordinate transformation of the step S204, the coordinate values (θ1, φ1) of the spherical image are used as the input values. Accordingly, the transformed coordinate values (θ2, φ2) are obtained. In other words, the generation process of a transformed spherical image is equivalent to the process of applying the pixel values of the transformed coordinate values (θ2, φ2), which are obtained from the coordinate values (θ1, φ1) as described above, to the input pixel values of the coordinate values (θ1, φ1) of the spherical image to obtain the pixel values of the transformed spherical image. By performing these processes as described above, a transformed spherical image is generated.

In a step S206, the omnidirectional camera 100 uses the extraction unit 220 to extract the center portion of the transformed spherical image to generate an extracted image. For example, such an extracted image may be extracted from the center of the spherical image with the one-half size of the spherical image lengthwise and breadthwise. In a step S207, the omnidirectional camera 100 uses the magnifying and letterbox adding unit 222 to magnify the extracted image according to the resolution and aspect ratio of the destination picture output device and add a black letterbox to the magnified extracted image. Accordingly, a display image is generated. In a step S208, the omnidirectional camera 100 uses the output unit 224 to output the generated display image through the picture output interface 129. Then, the process is terminated.

In the case of a still image, the processes in the steps S203 to S208 as depicted in FIG. 6 are repeated every time the attitude of the omnidirectional camera 100 is changed and the point of interest is changed. Alternatively, the processes in the steps S203 to S208 are repeated at prescribed intervals. In the case of moving images, the processes in the steps S201 to S208 as depicted in FIG. 6 are repeated for each frame of image.

Hereinafter, the processes that are performed in the second processing flow are described with reference to FIG. 7. The display-image outputting process as depicted in FIG. 7 starts in response to instructions for starting live viewing. In a step S301, the omnidirectional camera 100 uses the captured-image acquisition unit 202 to obtain the captured image from each of the two imaging elements 130A and 130B.

In a step S302, the omnidirectional camera 100 uses the joining unit 204 to detect the joining position of the obtained two partial-view images in the overlapping area and reflect the result of the joining position detection in the conversion parameter. Due to the reflection of the result of the joining position detection, the conversion parameters as depicted in FIG. 10A are corrected such that the coordinate values (x, y) of the partial-view image in which the correction of the joining position is reflected corresponds to the coordinate values (θ, φ) of the post-correction images.

In a step S303, the omnidirectional camera 100 uses the point-of-interest determining unit 214 to determine the point-of-interests (i.e., the attitude angles of the operation controller α, β, and γ) based on the data output from the attitude sensor of the external operation controller. In the present embodiment, the acceleration sensor, the gyroscope sensor, and the geomagnetic sensor are used in a combined manner to obtain the attitude angles of the operation controller α, β, and γ with reference to the state in which the operation controller is oriented towards the upward direction. Note that in the step S303, the attitude angles of the omnidirectional camera 100 are also detected, and the detected attitude angles of the camera α, β, and γ are corrected such that the zenith direction of the spherical image matches the vertical direction in the state where the operation controller is oriented towards the upward direction (i.e., in the state where the attitude angles (α, β, γ)=(0, 0, 0)). In the following description of the present embodiment, for the sake of explanatory convenience, it is assumed that the omnidirectional camera 100 is oriented towards the upward direction and fixed while an image is being captured.

In a step S304, the omnidirectional camera 100 uses the image rotating unit 216 to correct the conversion parameter based on the point of interest determined in the step S303. In the coordinate transformation of the step S304, the post-conversion coordinate values (θ, φ) as the conversion parameters depicted in FIG. 10A and FIG. 10B, which correspond to the coordinate values of the spherical image, are used as the input values (θ1, φ1) to perform the coordinate transformation. Accordingly, the transformed coordinate values (θ2, φ2) are obtained using the formulas (1) to (6) as described above. As the coordinate transformation has been described with reference to FIG. 12, the description of the coordinate transformation is omitted here.

In a step S305, the omnidirectional camera 100 uses the transformed-spherical-image generation unit 218 to generate a transformed spherical image directly from two captured partial-view images using the conversion parameter that reflects the result of the coordinate transformation. The coordinate values (θ, φ) as the conversion parameters are used as the input values (θ1, φ1) to calculate the transformed coordinate values (θ2, φ2). In other words, the generation process of a transformed spherical image is equivalent to the process of applying the pixel values of the coordinate values (x, y) of the partial-view image that corresponds to the transformed coordinate values (θ2, φ2), which are obtained from the coordinate values (θ1, φ1) as described above, to the input pixel values of the coordinate values (θ1, φ1) of the spherical image to obtain the pixel values of the transformed spherical image. Accordingly, two partial-view images that are developed in a spherical coordinate system are obtained. Then, the two partial-view images of a spherical coordinate system are combined with each other to generate a transformed spherical image.

In a step S306, the omnidirectional camera 100 uses the extraction unit 220 to extract the center portion of the transformed spherical image to generate an extracted image. In a step S307, the omnidirectional camera 100 uses the magnifying and letterbox adding unit 222 to magnify the extracted image according to the resolution and aspect ratio of the destination device and add a black letterbox to the magnified extracted image. Accordingly, a display image is generated. In a step S308, the omnidirectional camera 100 uses the output unit 224 to output the generated display image through the picture output interface 129. Then, the process is terminated.

Note that the processes in the steps S301 to S308 as illustrated in FIG. 7 are repeated for each frame interval.

Figure 13A:
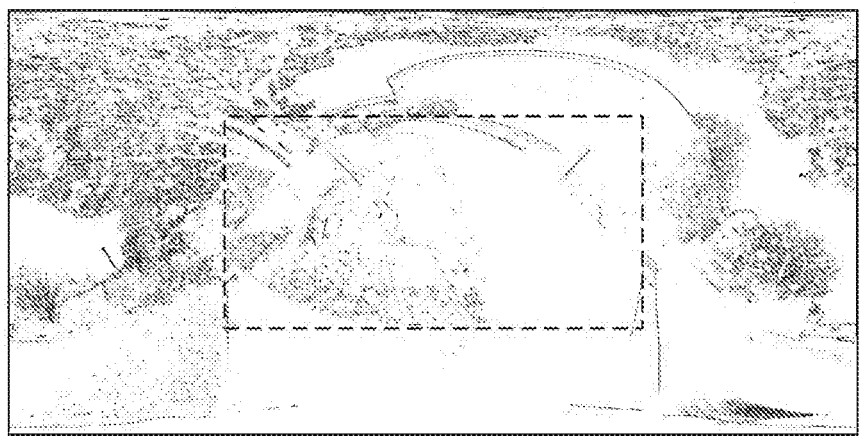
FIG. 13A, FIG. 13B, and FIG. 13C are diagrams illustrating transformed spherical images generated by an omnidirectional camera by rotating an image at each point of interest, according to an embodiment of the present invention.
Figure 13B:
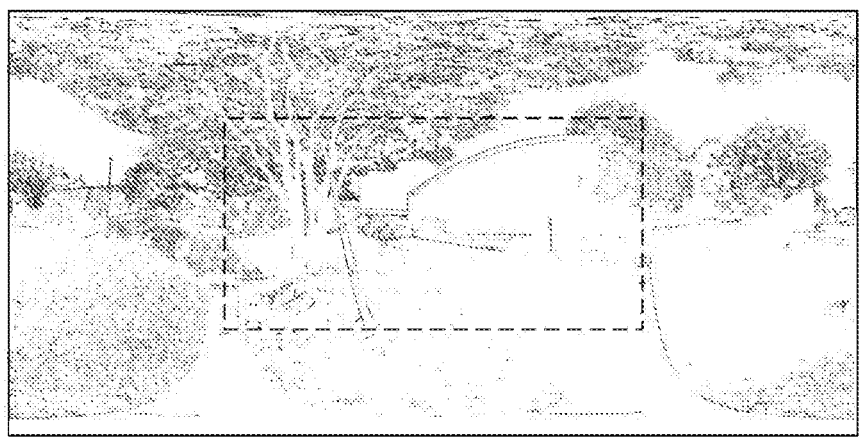
Figure 13C:
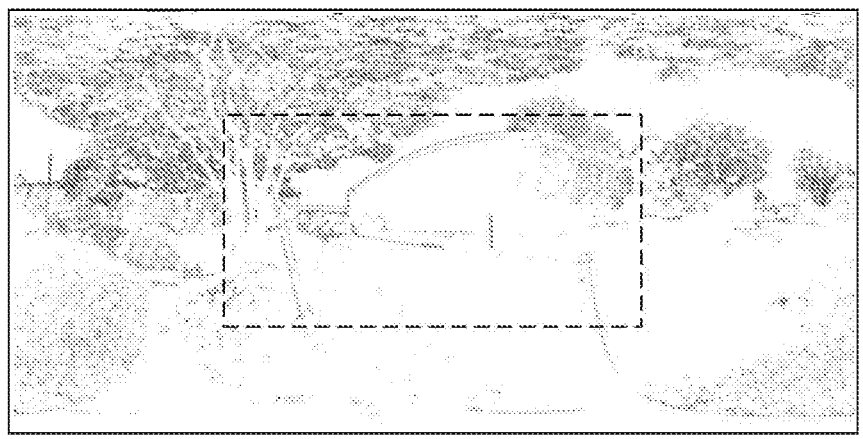

FIG. 13A, FIG. 13B, and FIG. 13C are diagrams illustrating transformed spherical images generated by the omnidirectional camera 100 by rotating an image according to each point of interest, with the center portions to be extracted from these transformed spherical images, according to the present embodiment. FIG. 13B illustrates a transformed spherical image at a point of interest that serve as a reference and a center portion to be extracted. FIG. 13B indicates a state in which the operation controller (i.e., the omnidirectional camera 100 or an external operation controller) is vertically oriented and supported.

By contrast, FIG. 13A indicates a transformed spherical image and a center portion to be extracted when the operation controller is inclined from the attitude indicated in FIG. 13B and the point of interest indicated in FIG. 13B is moved downward. FIG. 13C indicates a transformed spherical image and a center portion to be extracted when the operation controller is rotated around the axis of the operation controller from the attitude indicated in FIG. 13B and the point of interest indicated in FIG. 13B is moved to the right.

As illustrated in FIG. 13A, FIG. 13B, and FIG. 13C, in the present embodiment, coordinate transformation is performed on a spherical image based on the point of interest determined by the data output from a sensor such as the attitude sensor, and a portion of the spherical image on which the coordinate transformation has been performed is extracted. Accordingly, a displayed image to be output is generated. In a preferred embodiment, a center portion of the transformed spherical image is extracted to generate as a display image an image extracted from a spherical image around a point of interest.

According to the embodiment described as above, a display image extracted from a spherical image, about which a viewer does not feel awkward, can be generated with a small amount of load. According to the preferred embodiment, coordinate transformation is performed such that an image having a point of interest at the center is placed at a center portion of a spherical image where the amount of distortion is small. Accordingly, a viewer can view a natural-looking image without using a special-purpose viewer. Moreover, the coordinate transformation is integrated into the omnidirectional camera 100 for performing zenith correction, and no extra instrumentation cost is required for the omnidirectional camera 100. Further, the power consumption and the amount of heat generation in image processing can also be reduced.

According to the embodiments as described above, an image processing system, image processing method, program, and an imaging system can be provided in which a natural-looking display image of an object image can be generated for a viewer with a small amount of load.

In the embodiments described above, the image processing system and the imaging system are described with reference to the omnidirectional camera 100. However, configuration of the image processing system and imaging system is not limited to the embodiments described above.

In a further alternative embodiment, some of the functional units 202 to 224 may be implemented in a distributed manner on an at least one external image processing device such as a personal computer, a server, and a computer that can operate as an operation controller. In a particular embodiment, the point-of-interest determining unit 214, the image rotating unit 216, the transformed-spherical-image generation unit 218, the extraction unit 220, the magnifying and letterbox adding unit 222, and the output unit 224 as described above may be provided for an omnidirectional camera that includes the imaging elements 130A and 130B and serves as an imaging device, or may be provided for an image processing device separated from the omnidirectional camera. Note that the operation controller may be a device separated from the omnidirectional camera or the image processing device, or the operation controller may be a device separated from both the omnidirectional camera and the image processing device.

Further, the order in which the joining process by the joining unit 204, the image rotation by the image rotating unit 216, and the extraction process by the extraction unit 220 are performed is not limited to the order of the embodiment depicted in FIG. 3. Apart from the order of processes (1) in which joining is performed, image rotation is performed, and then extraction is performed and output is performed, the order of the processes may be as follows in alternative embodiments. (2) image rotation is performed, joining is performed, and then extraction is performed and output is performed. (3) Image rotation is performed, extraction is performed, and then joining is performed and output is performed. (4) Joining is performed, extraction is performed, and then image rotation is performed and output is performed. (5) Extraction is performed, joining is performed, and then image rotation is performed and output is performed.

(6) Extraction is performed, image rotation is pert and then joining is performed and output is performed. Furthermore, image rotating and extraction may be performed for moving images.

The functional units as described above is realized by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), electrically programmable read only memory (EPROM), flash memory, flexible disk, compact disc read only memory (CD-ROM), compact disc rewritable (CD-RW), digital versatile disk (DVD)-ROM, FAT)-RAM, DVD-RW, Bill-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Embodiments of the present invention has been described above, but the present invention is not limited to those embodiments and various applications and modifications may be made without departing from the scope of the invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image processing system, comprising:
    an image capturing device including a plurality of lens optical systems and a plurality of imaging elements that generate a plurality of image data in response to an image capture instruction; and
    processing circuitry configured to:
        receive an inclination of an operation controller with respect to a reference direction, the inclination being detected by a sensor of the operation controller that is external to the image capturing device;
        join the plurality of image data to generate combined image data;
        transform the combined image data, including all of the image data generated by the image capturing device, to generate transformed image data, the processing circuitry transforming the combined image data based on the received inclination of the operation controller that is external to the image capturing device and the processing circuitry transforming the combined image data to change a point of interest to a center point of the transformed image data;
        generate spherical image data from the transformed image data;
        extract a portion of the spherical image data surrounding the center point of the spherical image data; and
        output the extracted portion of the spherical image data as spherical video data.

2. The image processing system according to claim 1, wherein the processing circuitry is configured to transform the combined image data including all of the image data based on the point of interest, determined by data output from the sensor, with respect to the received inclination.

3. The image processing system according to claim 2, wherein the processing circuitry transforms the combined image data including all of the image data according to
    a first coordinate transformation in which coordinates of the plurality of image data are transformed into three-dimensional coordinates,
    a second coordinate transformation in which three-dimensional and rotational transformation is performed for the three-dimensional coordinates obtained in the first coordinate transformation, and
    a third coordinate transformation in which coordinates of the three-dimensional coordinates obtained by the three-dimensional and rotational transformation are transformed into coordinates of a spherical coordinate system.

4. The image processing system according to claim 2, wherein the point of interest is the center point.

5. The image processing system according to claim 2, wherein the data output from the sensor includes data obtained by at least one of an acceleration sensor, a gyroscope sensor, and a geomagnetic sensor.

6. The image processing system according to claim 1, wherein each lens optical system and corresponding imaging element captures an image in a different direction from other lens optical systems and corresponding imaging elements.

7. The image processing system according to claim 6, wherein
the plurality of lens optical systems each have prescribed angles of view, and
the angles of view of the plurality of lens optical systems are joined together to meet a solid angle of $4\pi$ steradian.

8. An image processing system, comprising:
an image capturing device including a plurality of lens optical systems and a plurality of imaging elements that generate a plurality of image data in response to an image capture instruction; and
processing circuitry configured to:
receive an inclination of an operation controller with respect to a reference direction, the inclination being detected by a sensor of the operation controller that is external to the image capturing device;
join the plurality of image data to generate combined image data,
transform the combined image data, including all of the image data generated by the image capturing device, to generate transformed image data, the processing circuitry transforming the combined image data based on the received inclination of the operation controller that is external to the image capturing device and the processing circuitry transforming the combined image data to change a point of interest to a center point of the transformed image data;
generate spherical image data from the transformed image data;
extract a portion of the spherical image data surrounding the center point of the spherical image data; and
output the extracted portion of the spherical image data.

9. The image processing system according to claim 8, wherein the processing circuitry is configured to transform the spherical image data based on a point of interest, determined by data output from the sensor, with respect to the received inclination.

10. The image processing system according to claim 9, wherein the processing circuitry transforms the spherical image data according to
a first coordinate transformation in which coordinates of the plurality of image data are transformed into three-dimensional coordinates,
a second coordinate transformation in which three-dimensional and rotational transformation is performed for the three-dimensional coordinates obtained in the first coordinate transformation, and
a third coordinate transformation in which coordinates of the three-dimensional coordinates obtained by the three-dimensional and rotational transformation are transformed into coordinates of a spherical coordinate system.

11. The image processing system according to claim 9, wherein the point of interest is the center point.

12. The image processing system according to claim 9, wherein the data output from the sensor includes data obtained by at least one of an acceleration sensor, a gyroscope sensor, and a geomagnetic sensor.

13. The image processing system according to claim 8, further wherein each lens optical system and corresponding imaging element captures an image in a different direction from other lens optical systems and corresponding imaging elements.

14. The image processing system according to claim 13, wherein
the plurality of lens optical systems each have prescribed angles of view, and
the angles of view of the plurality of lens optical systems are joined together to meet a solid angle of $4\pi$ steradian.

15. A method of processing an image by an image processing system, the method comprising:
receiving an inclination of an operation controller with respect to a reference direction, the inclination being detected by a sensor of the operation controller that is external to an image capturing device, the image capturing device generating a plurality of image data in response to an image capture instruction;
joining the plurality of image data to generate combined image data;
transforming, with processing circuitry, the combined image data which includes the image data generated by the image capturing device to generate transformed image data, the transforming the combined image data based on the received inclination of the operation controller that is external to the image capturing device and the transforming the combined image data is to change a point of interest to a center point of the transformed image data;
generating spherical image data from the transformed image data;
extracting a portion of the spherical image data surrounding the center point of the spherical image data; and
outputting the extracted portion of the spherical image data as spherical video data display.

16. The method according to claim 15, wherein the transforming includes transforming the combined image data based on the point of interest, determined by data output from the sensor, with respect to the received inclination.

17. The method according to claim 16, wherein the transforming includes
a first coordinate transformation in which coordinates of the image data are transformed into three-dimensional coordinates,
a second coordinate transformation in which three-dimensional and rotational transformation is performed for the three-dimensional coordinates obtained in the first coordinate transformation, and
a third coordinate transformation in which coordinates of the three-dimensional coordinates obtained by the three-dimensional and rotational transformation are transformed into coordinates of a spherical coordinate system.

18. The image processing system according to claim 1, wherein the extracted portion of the transformed image data has a rectangular shape.

19. The image processing system according to claim 1, wherein the center point of the transformed image data is a center of an entire image.

20. A non-transitory computer-readable storage medium including computer executable instructions, wherein the instructions, when executed by an image processing system, cause the image processing system to perform a method, the method comprising:
- receiving an inclination of an operation controller with respect to a reference direction, the inclination being detected by a sensor of the operation controller that is external to an image capturing device, the image capturing device generating a plurality of image data in response to an image capture instruction;
- joining the plurality of image data to generate combined image data;
- transforming the combined image data, including all of the image data generated by the image capturing device, to generate transformed image data, the transforming the combined image data based on the received inclination of the operation controller that is external to the image capturing device and the transforming the combined image data is to change a point of interest to a center point of the transformed image data;
- generating spherical image data from the transformed image data;
- extracting a portion of the spherical image data surrounding the center point of the spherical image data; and
- outputting the extracted portion of the spherical image data as spherical video data.

* * * * *